(12) United States Patent
Diegel et al.

(10) Patent No.: US 7,671,583 B2
(45) Date of Patent: Mar. 2, 2010

(54) SENSOR ELEMENT WITH LAMINATED AND SPIRAL STRUCTURE AND WITHOUT A POWER SUPPLY FOR A REVOLUTION COUNTER

(75) Inventors: Marco Diegel, Jena (DE); Roland Mattheis, Jena (DE)

(73) Assignee: Horst Siedle GmbH & Co. KG, Furtwangen (DE)

( * ) Notice: Subject to any disclaimer, the term of this patent is extended or adjusted under 35 U.S.C. 154(b) by 552 days.

(21) Appl. No.: 11/587,310

(22) PCT Filed: Apr. 6, 2005

(86) PCT No.: PCT/EP2005/003588

§ 371 (c)(1),
(2), (4) Date: Jun. 11, 2007

(87) PCT Pub. No.: WO2005/106395

PCT Pub. Date: Nov. 10, 2005

(65) Prior Publication Data

US 2007/0285087 A1 Dec. 13, 2007

(30) Foreign Application Priority Data

Apr. 24, 2004 (DE) .................... 10 2004 020 149

(51) Int. Cl.
*G01B 7/30* (2006.01)
(52) U.S. Cl. .................... 324/207.21; 324/207.25
(58) Field of Classification Search .................. None
See application file for complete search history.

(56) References Cited

U.S. PATENT DOCUMENTS

| 4,658,162 | A | * | 4/1987 | Koyama et al. | ............. 310/68 R |
| 4,835,509 | A | | 5/1989 | Yoshino et al. | |
| 5,475,304 | A | * | 12/1995 | Prinz | ............. 324/207.21 |
| 5,648,885 | A | | 7/1997 | Nishioka et al. | |
| 6,057,167 | A | | 5/2000 | Shieh et al. | |
| 7,239,131 | B2 | * | 7/2007 | Halder et al. | ............. 324/207.21 |
| 2003/0094945 | A1 | * | 5/2003 | Netzer | ............. 324/260 |

FOREIGN PATENT DOCUMENTS

| DE | 3841252 | 6/1989 |
| EP | 0644529 | 3/1995 |
| WO | WO 2004/020952 | 3/2004 |

OTHER PUBLICATIONS

International Search Report (PCT/ISA/210).

* cited by examiner

*Primary Examiner*—Jay M Patidar
(74) *Attorney, Agent, or Firm*—Harness, Dickey & Pierce, P.L.C.

(57) ABSTRACT

A sensor element for a revolution counter includes a laminated structure suitable to cause a change in magnetisation in the sensor element without a power supply, simply by the displacement of a magnetic field past the sensor element. Moreover, the laminated structure is suitable for storing a plurality of such changes. The sensor element has a spiral structure.

21 Claims, 12 Drawing Sheets

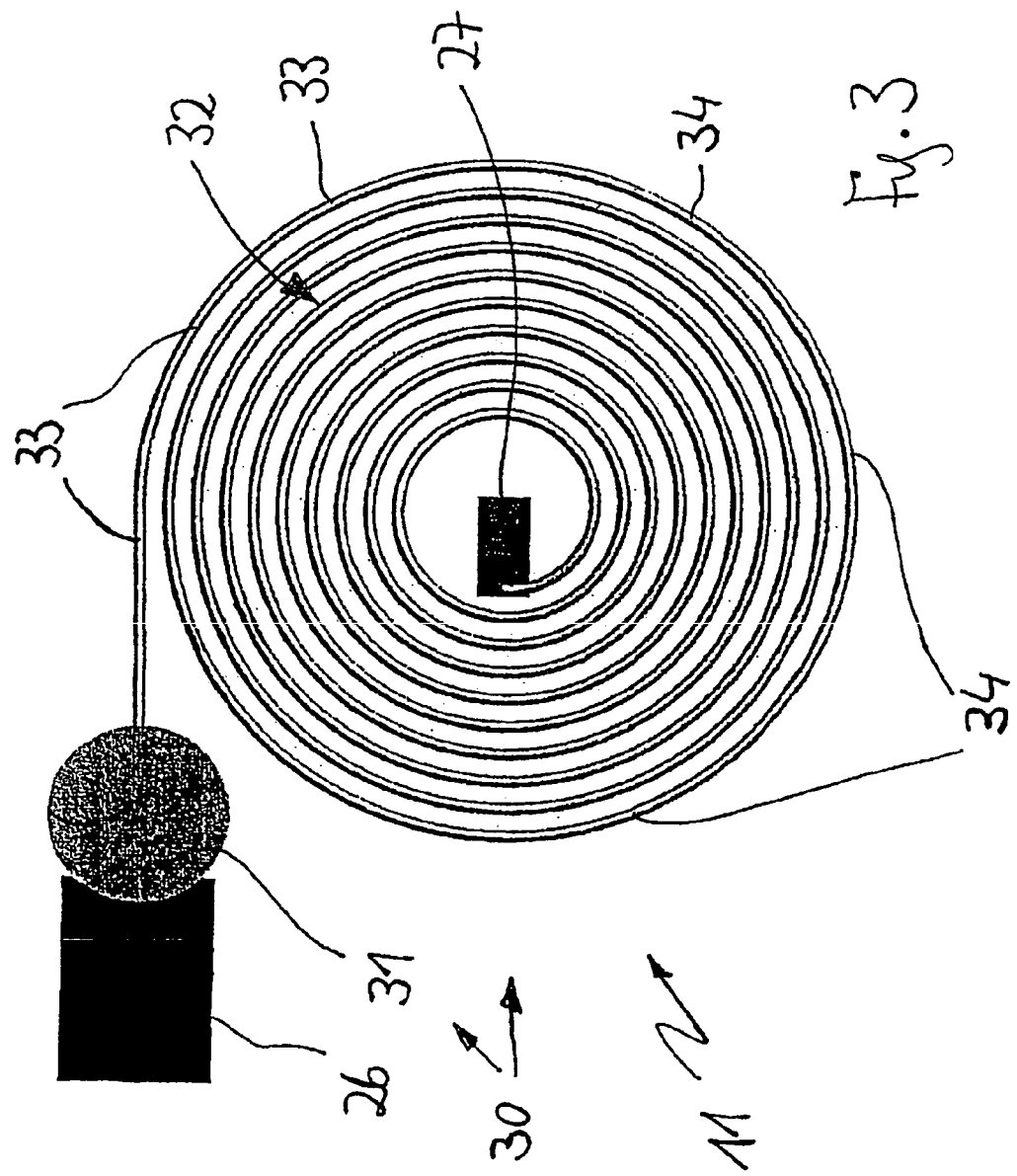

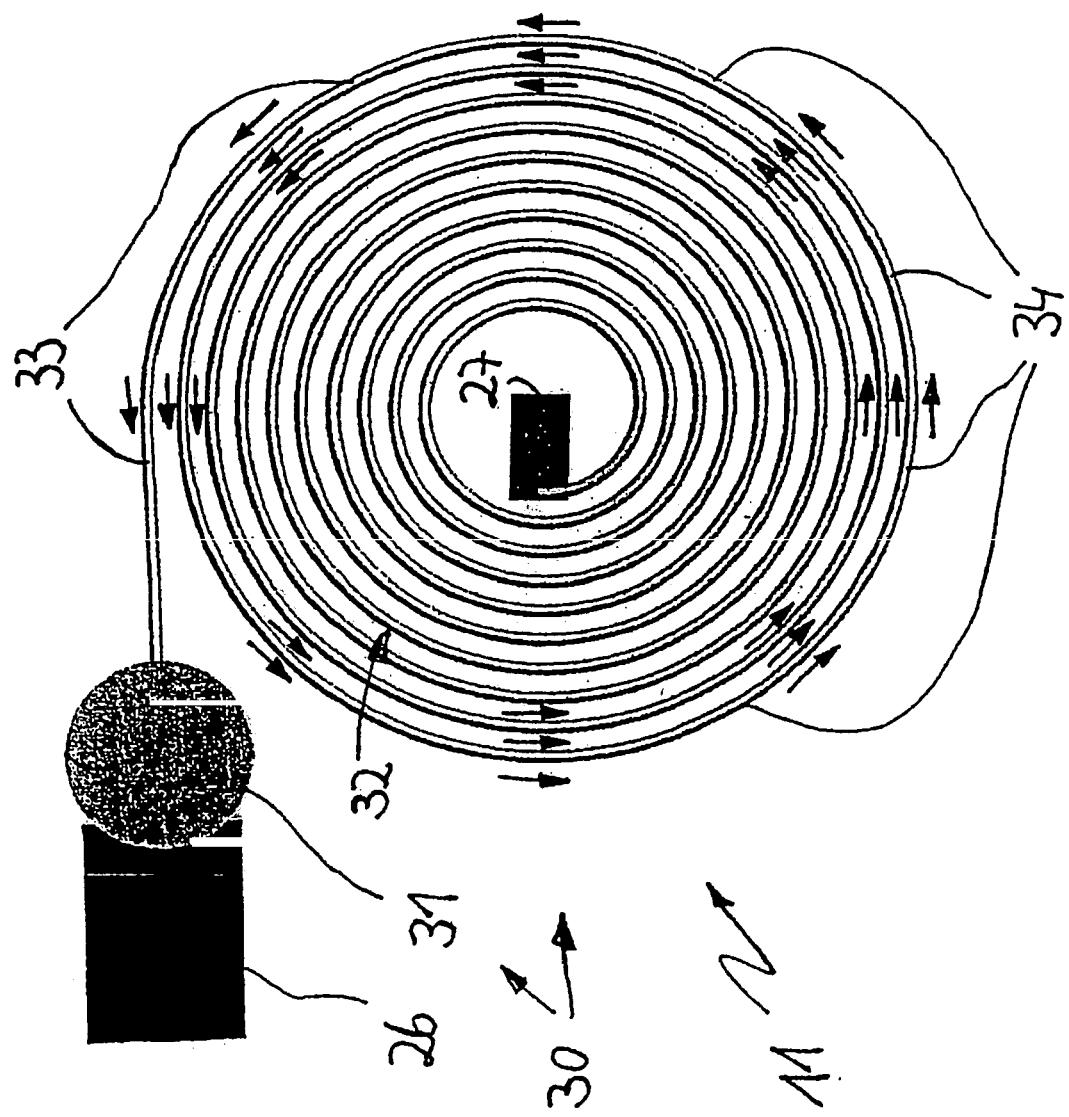

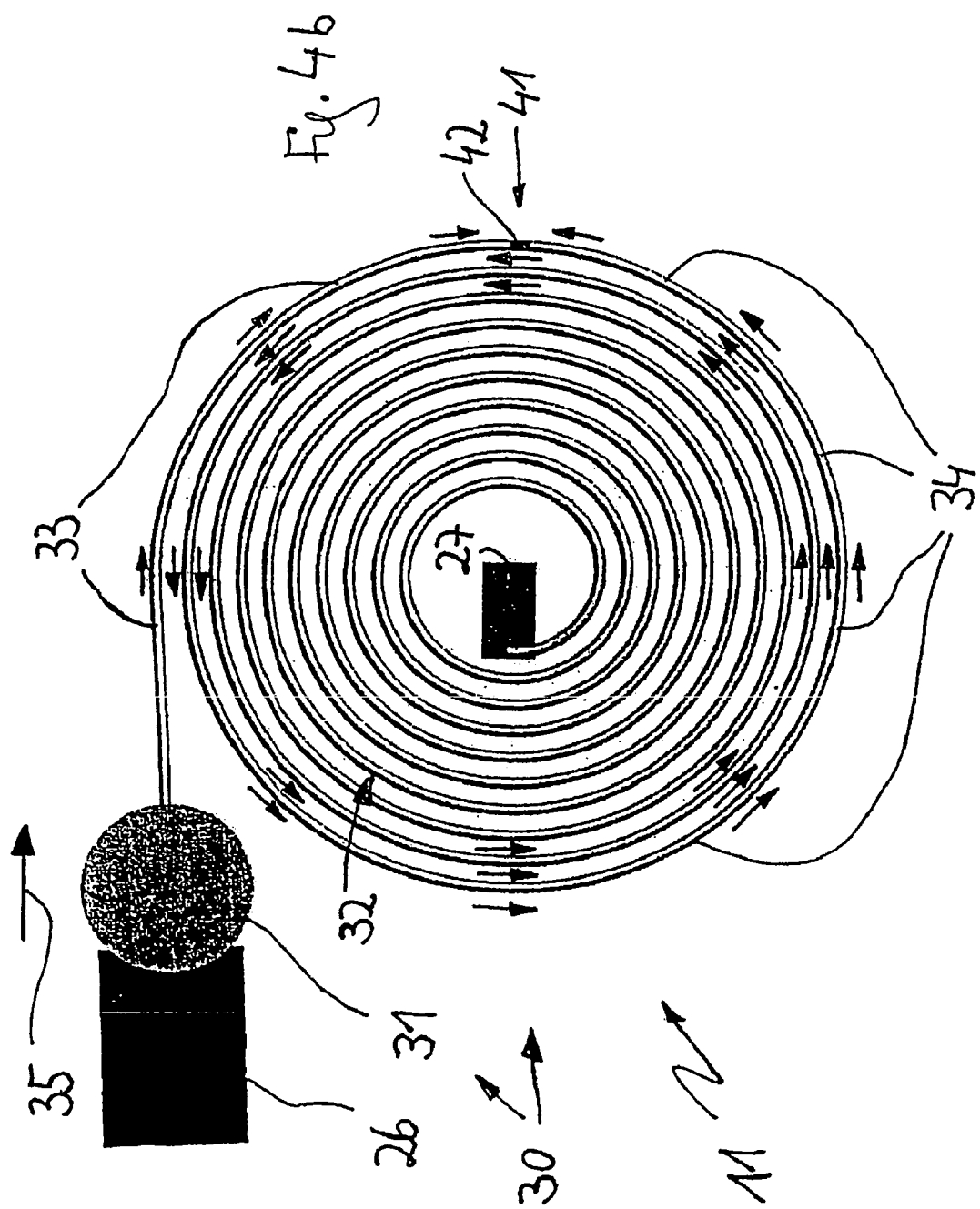

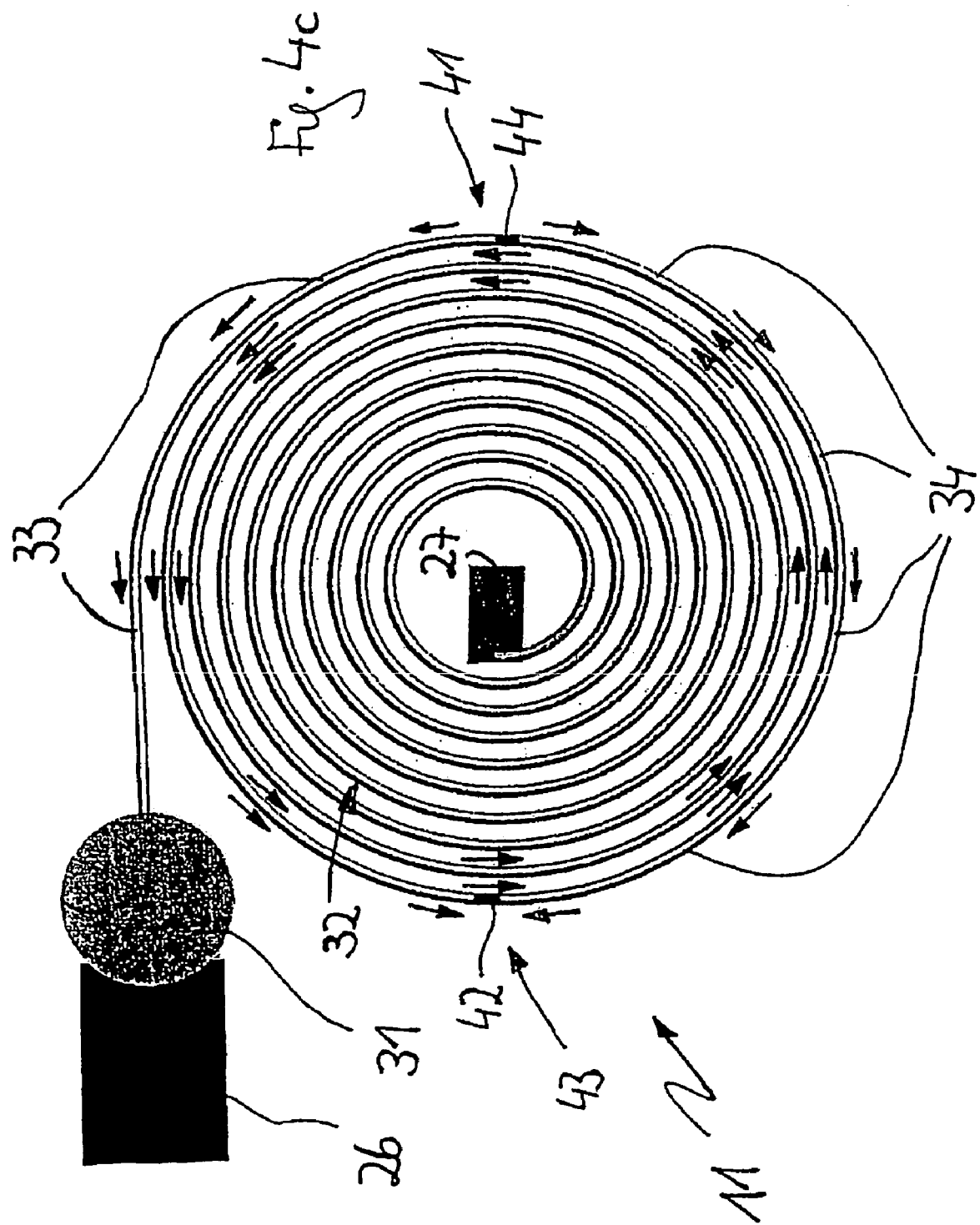

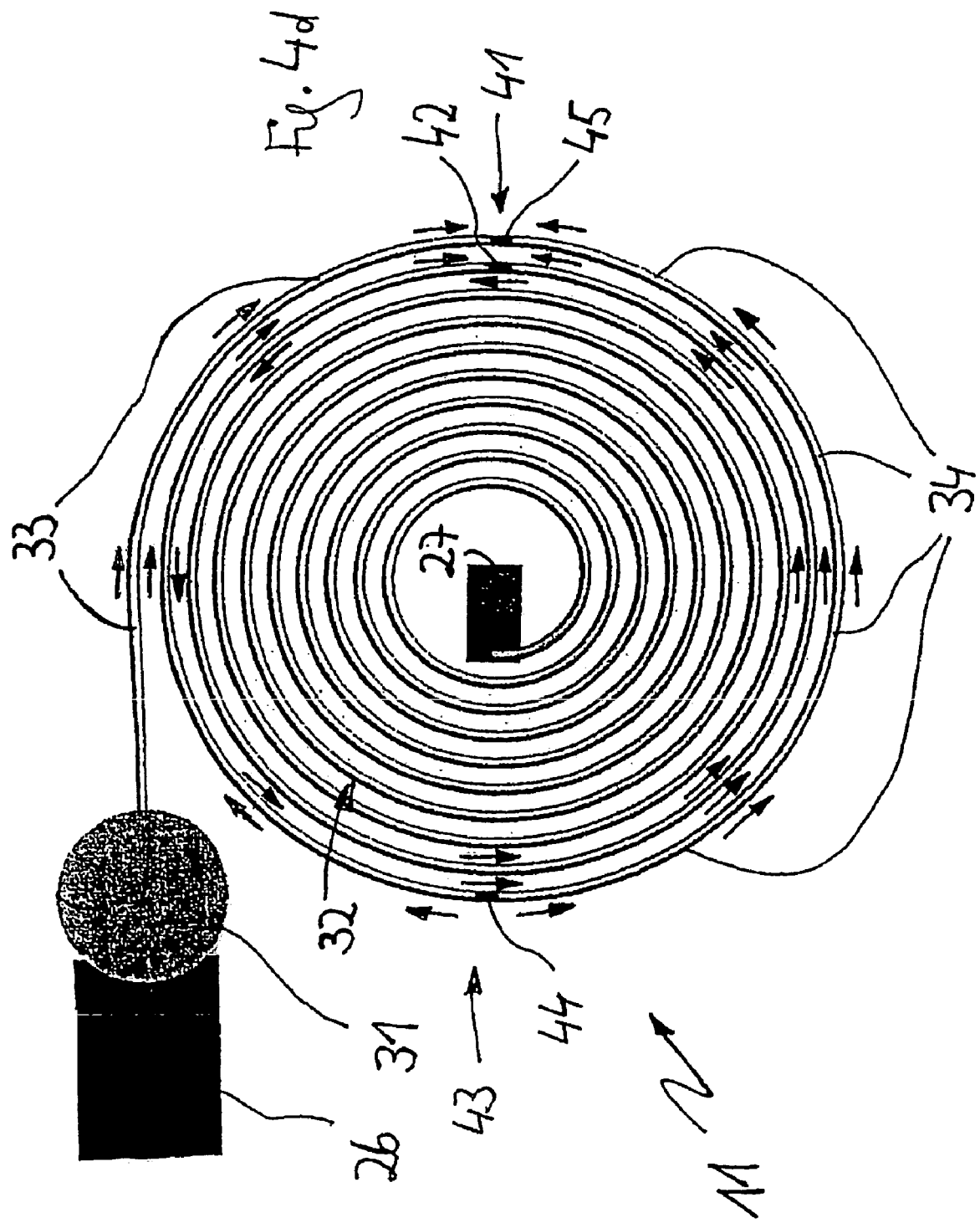

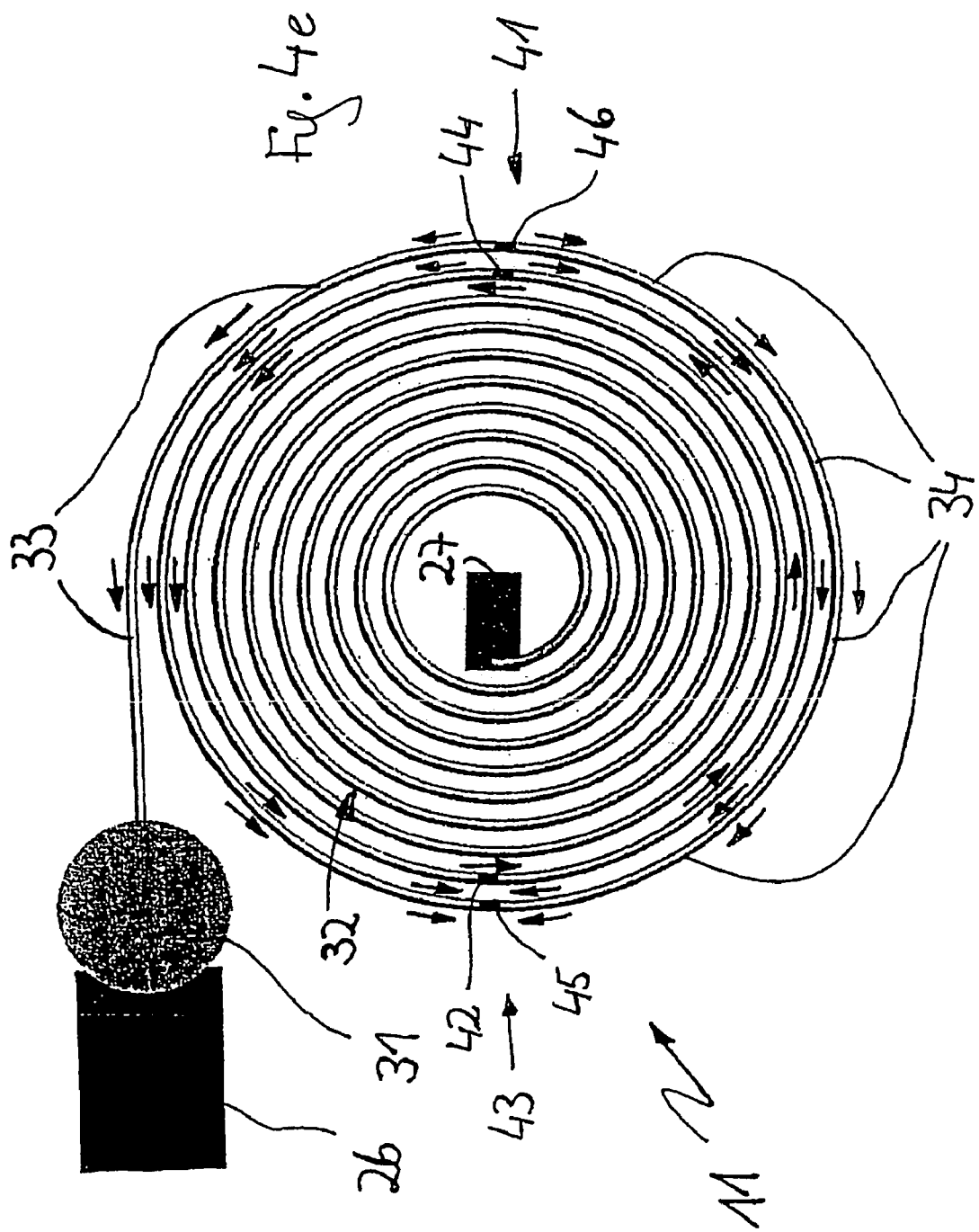

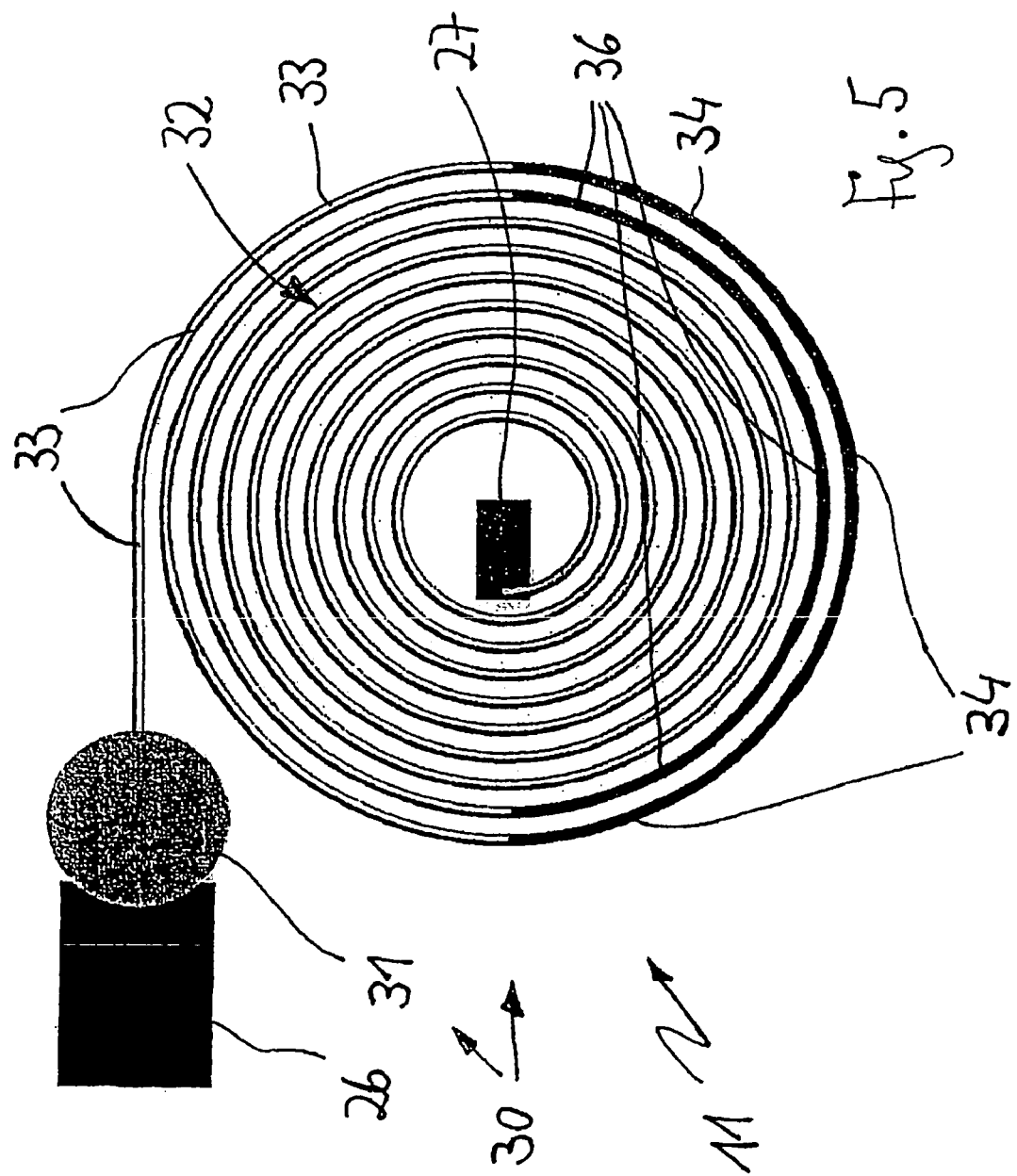

Figure 1:
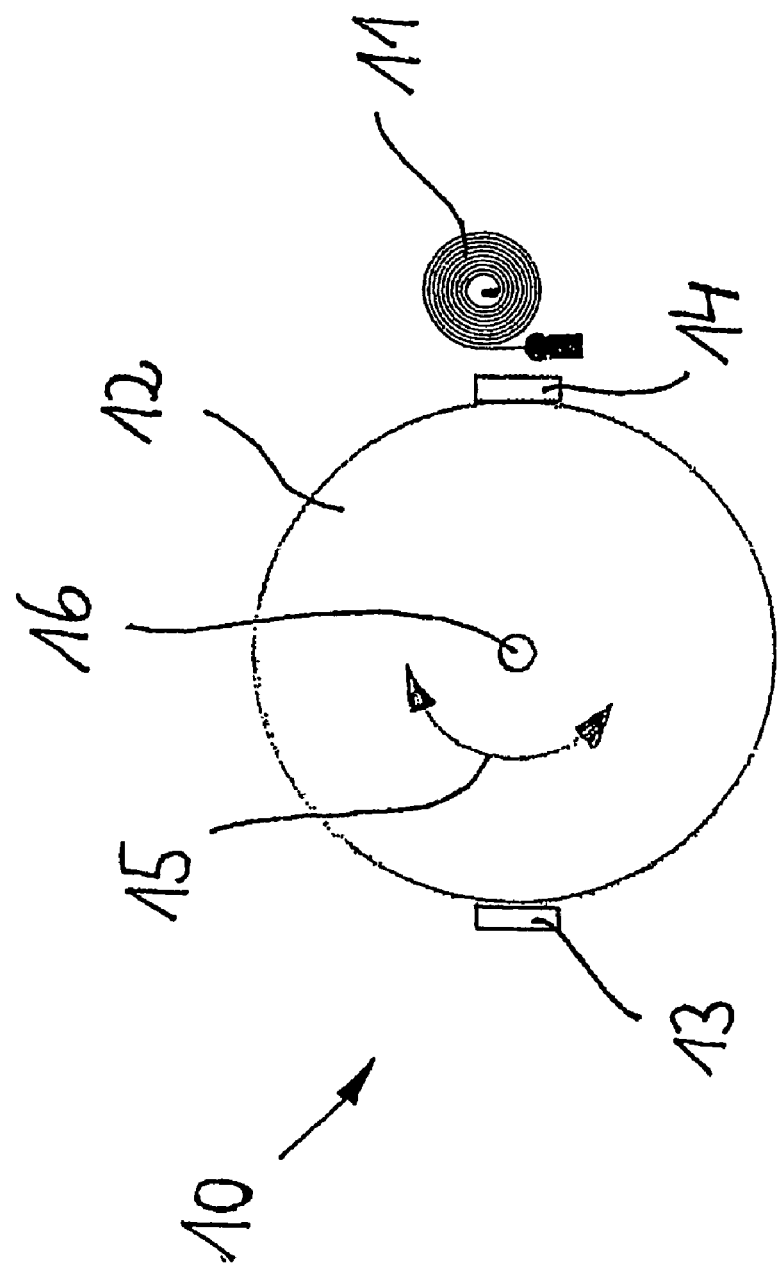

ized at once, and is always aligned in the same direction as

SENSOR ELEMENT WITH LAMINATED AND SPIRAL STRUCTURE AND WITHOUT A POWER SUPPLY FOR A REVOLUTION COUNTER

STATE OF THE ART

The invention relates to a sensor element in particular for a revolution counter.

A sensor element of this type is known from WO 2004/020952 A2. The laminated design of the known sensor element is structured in such a way that without power supply in the sensor element a change in magnetization is caused when a magnetic field is moved past the sensor element. Furthermore, the known sensor element is capable of storing a plurality of such changes. For example, the number of the stored changes can be determined with the aid of the Giant Magneto Resistance (GMR) effect, the Tunnel Magneto Resistance (TMR) effect or the Colossal Magneto Resistance (CMR) effect.

It has been shown that the measurability of these changes in the known sensor element is associated with high expenditures.

OBJECT, SOLUTION AND ADVANTAGES OF THE INVENTION

The object of the present invention is to create a sensor element in particular for a revolution counter, in which the changes in the magnetization are ascertainable without great expenditure.

The invention proposes a sensor element that has a laminated structure, which without a power supply is capable of causing a change in magnetization in the sensor element when a magnetic field is moved past the sensor element. Furthermore, the laminated structure is capable of storing a plurality of such changes. According to the invention, the shape of the sensor element is designed such that the sensor element has a spiral structure.

It has become evident that the spiral structure described in the invention is particularly well suited for storing the change in magnetization of the sensor element caused by a passing magnetic field. In particular, the spiral structure can store a plurality of such changes well.

Furthermore, it requires only little expenditure to read the changes in magnetization stored in the spiral structure from the spiral structure and thereby to count them.

The spiral structure is therefore particularly well suited for storing and reading the changes in magnetization of the sensor element.

In an advantageous further development of the invention, one end of the spiral structure is connected to an area designated as a field generator. The field generator is specifically designed as a substantially circular surface. Through the circular design of the field generator, the direction of magnetization of the sensor layer of the field generator can follow a passing magnetic field with particular ease.

In a further advantageous development of the invention, the field generator is connected to a first electrical contact. Preferably, the other optionally tapering end of the spiral design is connected to a second electrical contact. Via the two contacts, it is possible to read the changes in magnetization of the sensor element stored in the spiral structure in a particularly simple way, and thus to count them.

In a further advantageous development of the invention, the sensor element has a laminated structure with at least one hard magnetic layer, which represents a reference layer in which the magnetization is not changed by a passing magnetic field. Preferably, this magnetization of the reference layer has an orientation that is approximately parallel to the course of the spiral structure and is always aligned in the same direction as the spiral structure.

Further characteristics, application possibilities and advantages of the invention are apparent from the following description of exemplary embodiments of the invention illustrated in the figures of the drawing. All characteristics that are described or depicted thereby present, in themselves or in any random combination, the object of the invention, regardless of the summary in the patent claims or their reference, as well as regardless of their formulation or, that is to say, representation in the description, or rather, in the drawing.

EXEMPLARY EMBODIMENTS OF THE INVENTION

Figure 2:
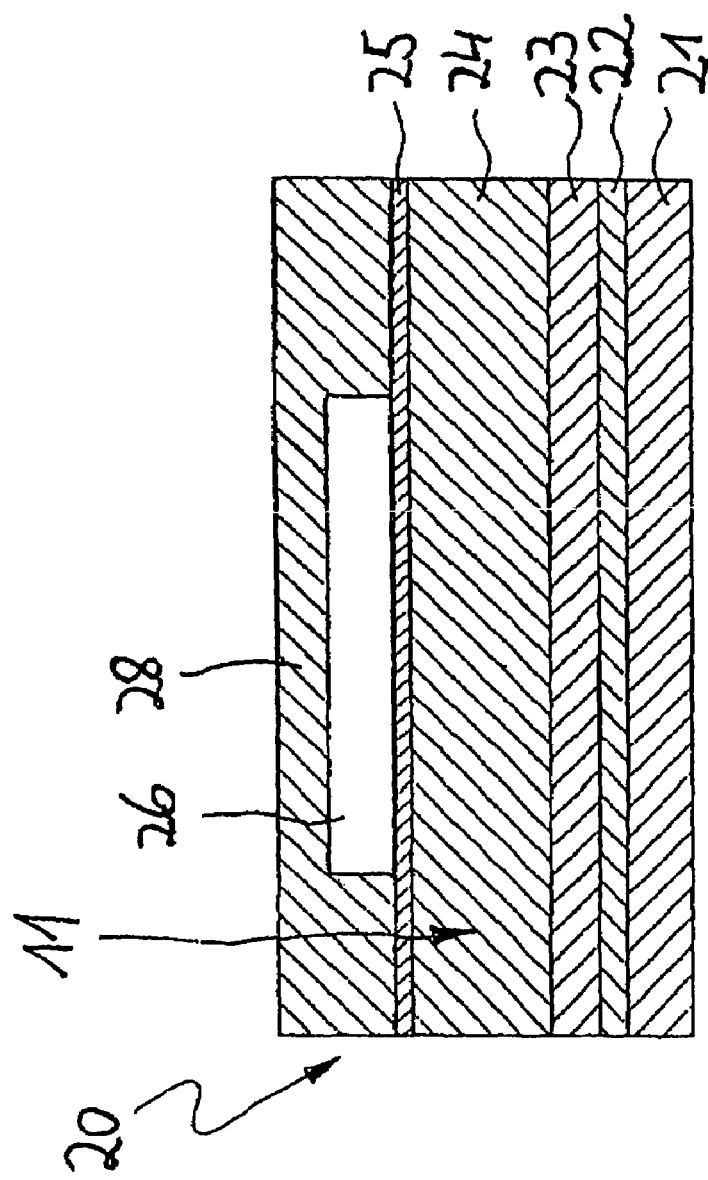
Figure 6:
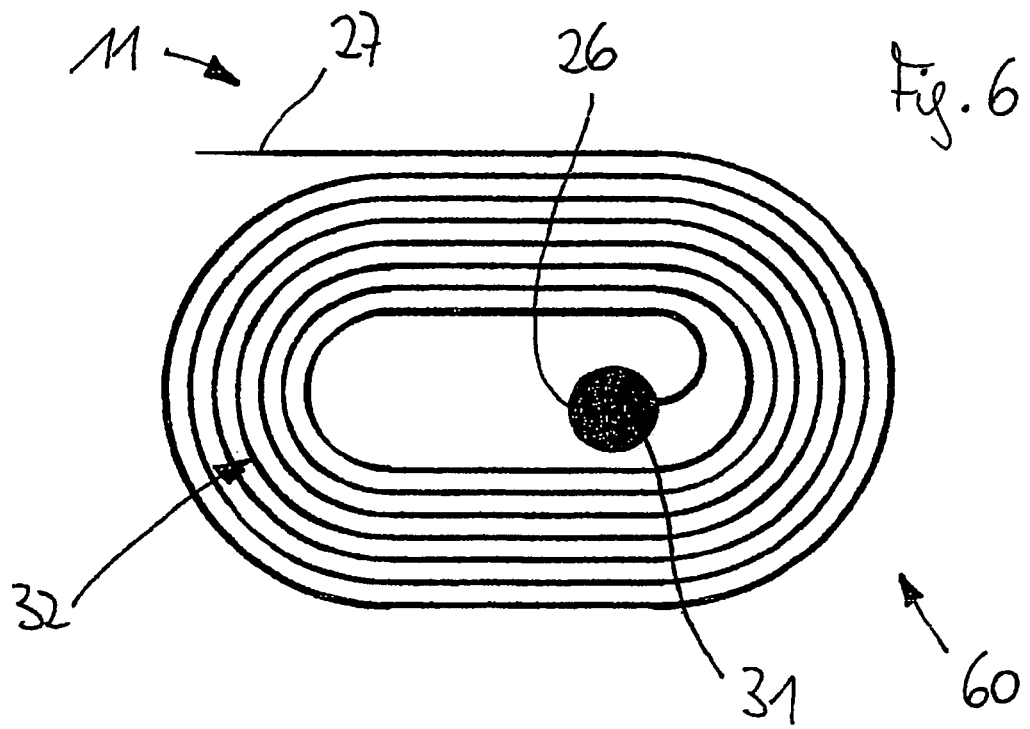
Figure 7:
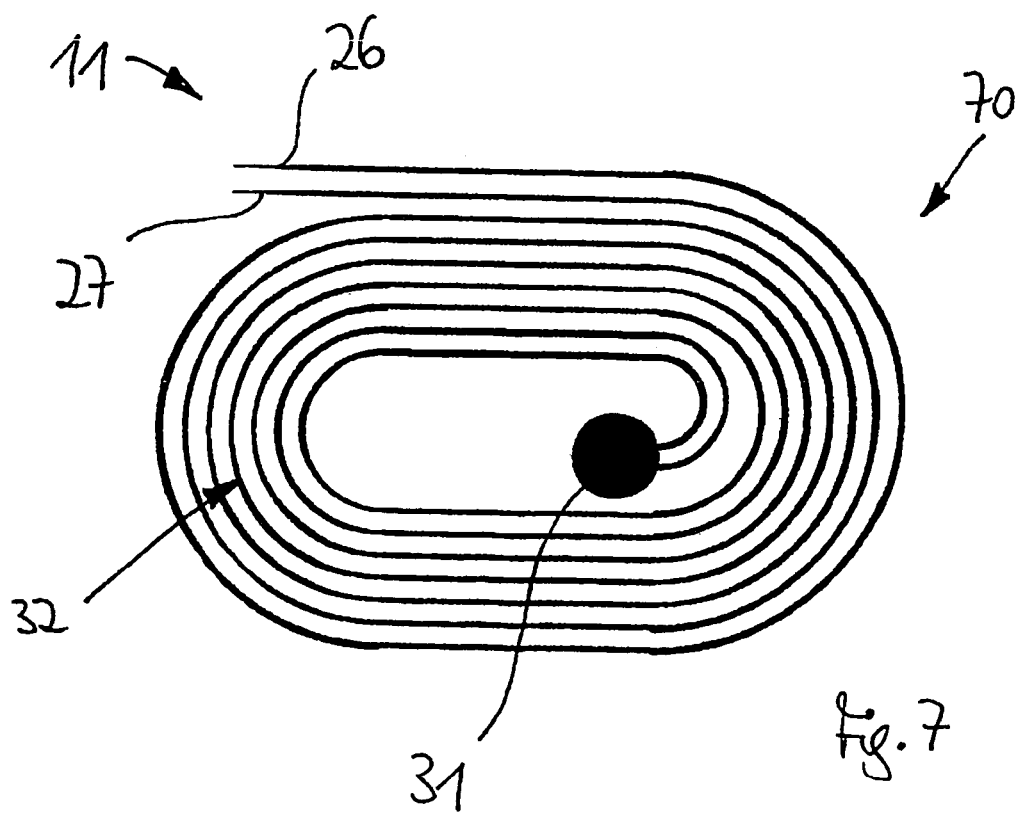
Figure 8:
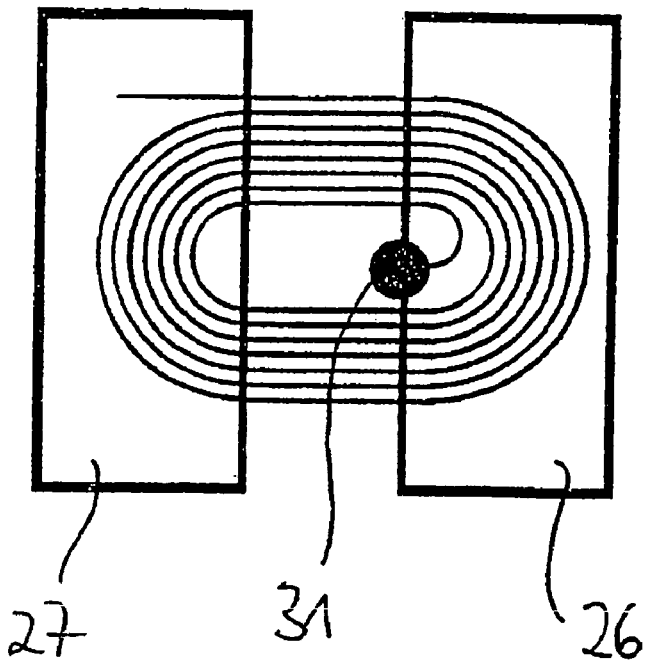
Figure 9:
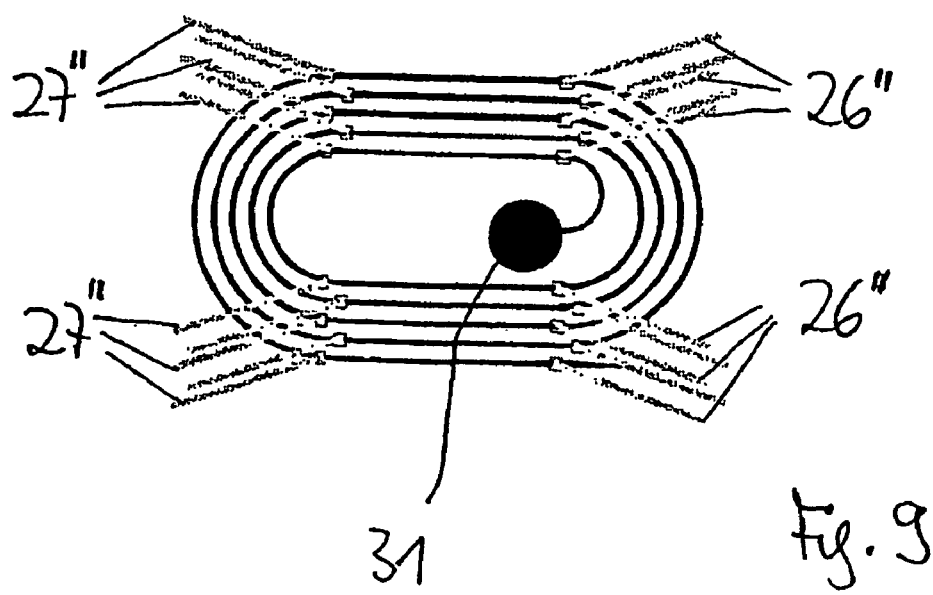
Figure 10A:
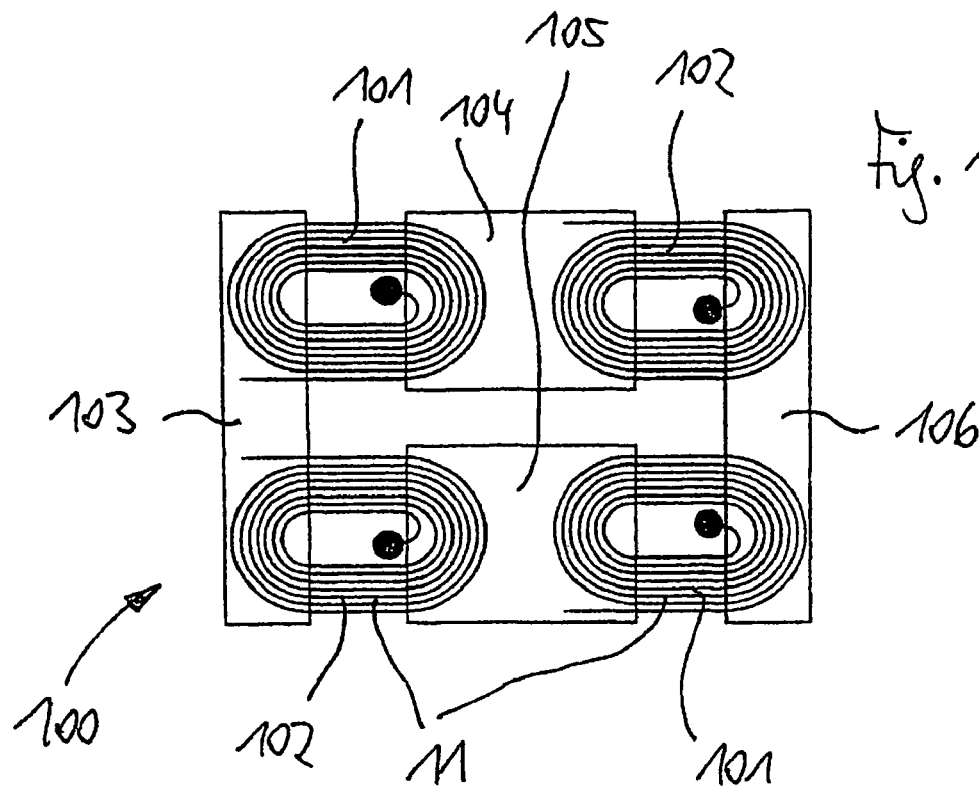
Figure 10B:
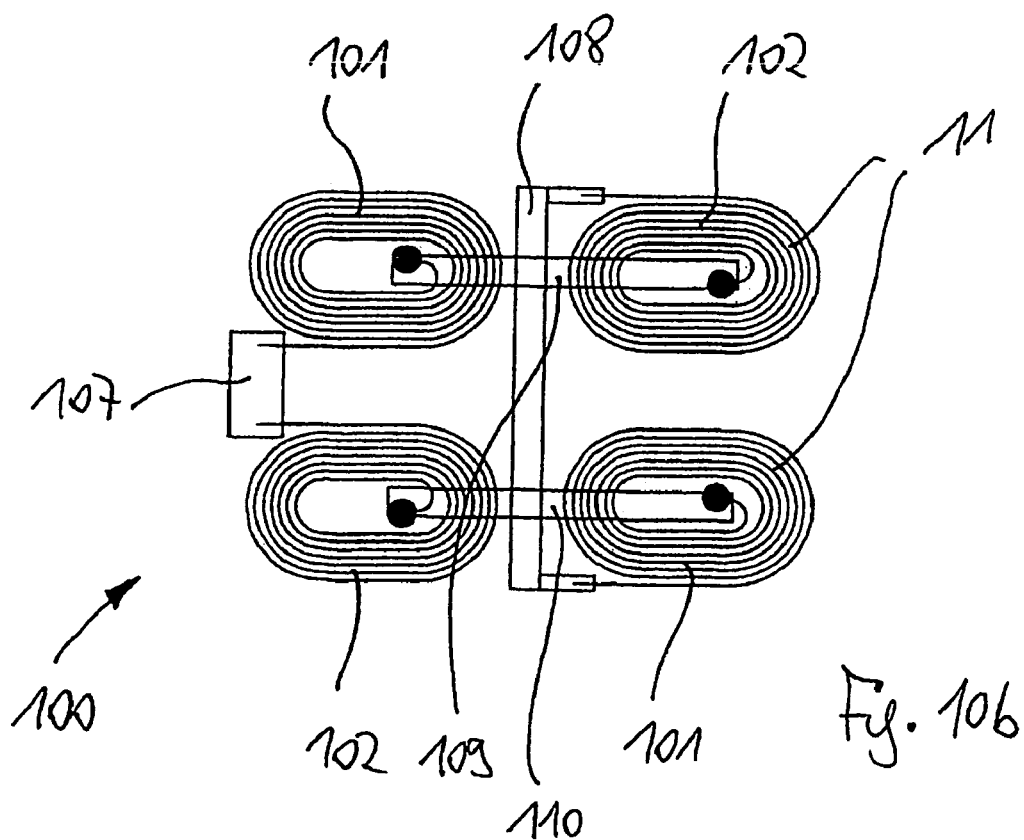

FIG. 1 shows a schematic top view of an exemplary embodiment of a revolution counter with a first exemplary embodiment of a sensor element according to the invention, FIG. 2 shows a schematic cross-section of the sensor element according to FIG. 1, FIG. 3 shows a schematic top view of the sensor element according to FIG. 1, FIGS. 4a through 4e show schematic top views of the sensor element according to FIG. 1 with schematically depicted magnetizations, FIG. 5 shows a schematic top view of the sensor element according to FIG. 1 with schematically depicted changes, FIG. 6 shows a schematic top view of a second exemplary embodiment of the inventive sensor element according to FIG. 1, FIG. 7 shows a schematic top view of a third exemplary embodiment of the inventive sensor element according to FIG. 1, FIG. 8 shows a schematic top view of a fourth exemplary embodiment of the inventive sensor element according to FIG. 1, FIG. 9 shows a schematic top view of a fifth exemplary embodiment of the inventive sensor element according to FIG. 1, and FIGS. 10a and 10b show schematic top views of two Wheatstone Bridges, which are constructed with sensor elements according to the invention.

FIG. 1 depicts a revolution counter 10, on which a stationary sensor element 11 is associated with a rotor 12 with two permanent magnets 13, 14. Several sensor elements could also be present, which for example are disposed at equal distances from each other along the circumference of the rotor 12.

The rotor 12 can be rotated about an axis 16 in both directions, as shown by the arrow 15. Both permanent magnets 13, 14 rotate together with the rotor 12. With a rotation of the rotor 12, the magnetic fields of the permanent magnets 13, 14 are moved past the sensor element 11, and are detected by it.

The permanent magnets 13, 14 can be moved above or below the sensor element 11. It is essential that the magnetic fields of the permanent magnets 13, 14 have a sufficiently large, but not too strong an influence on the sensor element 11, particularly on its layers, which are subsequently illustrated in FIG. 2.

The magnetizations of the two permanent magnets 13, 14 oppose each other. This means that upon rotation of the rotor 12 in the same direction, the first permanent magnet 13 is moved past the sensor element 11 with, for example, a north-south orientation, while the second permanent magnet 14 is moved past the sensor element 11 with a south-north orientation.

From the view of the sensor element 11, the movement, for example, of the permanent magnet 13, has the following effects:

First, the sensor element 11 "sees" the magnetic flux lines emerging somewhat perpendicularly from the magnetic north of the permanent magnet 13, then the sensor element 11 "sees" the magnetic flux lines extending approximately parallel from the magnetic north to the magnetic south of the permanent magnet 13, and finally the sensor element 11 "sees" the magnetic flux lines entering the magnetic south of the permanent magnet 13 somewhat perpendicularly. Altogether, from the view of the sensor element 11, this represents a 180-degree rotation of the magnetic flux lines of the permanent magnet 13 during the passing movement.

In FIG. 1, the two permanent magnets 13, 14 are disposed 180 degrees across from each other on the circumference of the rotor 12. This distance can also be designed asymmetrically. For example, the two permanent magnets 13, 14 can also be disposed directly adjacent to each other on the circumference of the rotor 12.

The revolution counter 10 in FIG. 1 is designed for contact-free counting and storage of rotations of the rotor 10 [sic] by the sensor element 11. These counting and storage steps require no external power supply. For reading the stored rotations, for example, the Giant Magneto Resistance (GMR) effect, the Tunnel Magneto Resistance (TMR) effect or the Colossal Magneto Resistance (CMR) effect can be used.

FIG. 2 depicts a laminated structure 20 of the sensor element 11 using the GMR effect to read the stored rotations. A soft magnetic layer 21 is separated from a hard magnetic layer 23 by a thin non-magnetic layer 22. An anti-ferromagnetic layer 24 reinforces the hard magnetic properties of the hard magnetic layer 23 in the sense of a so-called "pinning" effect.

This latter [pinning] means that the magnetization in the hard magnetic layer 23, in contrast to the magnetization in the soft magnetic layer 21, is not changed by a passing magnetic field of one of the two permanent magnets 13, 14. The soft magnetic layer 21 therefore represents a sensor layer and the hard magnetic layer 23 a reference layer.

A contacting layer 25, on which a first contact 26 is provided, is located on the layer 24. As will be illustrated below, a second contact 27, not depicted in FIG. 2, is present in a different place on the sensor element 11. As a result, a measurement current can flow between the two contacts 26, 27 through the laminated structure 20. As likewise will be illustrated below, the total number of stored rotations can be inferred from the measurement current.

The contacting layer 25 can be covered by an insulating layer 28. For the purpose of contacting, the contacts 26, 27 are at least partially exposed in this case, and therefore not covered by the insulating layer 28. The entire laminated structure 20 can be, for example, applied on a silicon substrate. This laminated structure 20 is frequently referred to a spin valve.

In connection with the Tunnel Magneto Resistance (TMR) effect, one of the two contacts 26, 27 must be arranged beneath the non-magnetic layer 22, and the other of the two contacts 26, 27 must be arranged above the non-magnetic layer 22.

FIG. 3 depicts a form 30 of the sensor element 11 that exhibits a field generator 31 and a field storage unit 32. Furthermore, FIG. 3 depicts both contacts 26, 27.

The field generator 31 is designed as a circular surface and is connected to the contact 26. The field storage unit 32 is configured as a spiral whose external beginning is connected to the field generator 31, and which, starting from its beginning, is composed of spiral arcs whose radii become increasingly smaller. For example, the outermost turn of the spiral in FIG. 3 is made of the spiral arcs 33, 34. At the end of the spiral and thereby in the interior of the same, the spiral is connected to the contact 27.

It shall be pointed out that the field storage unit 32 does not have to be a spiral, but can also be a different spiral device. Thus, for example, the field storage unit 32 can be designed as a spiral form constructed from straight pieces, in which the length of the straight pieces continually becomes smaller, the further the straight pieces are arranged within the structure. Likewise, the field storage unit 32, for example, can be a square or polygonal spiral structure with square or rectangular pieces, in which the size of the square or rectangular pieces becomes increasingly smaller, the further they are arranged in the interior of the structure. Furthermore, it is also possible that the corners of this spiral structure are rounded.

Hereinafter, the present exemplary embodiment will be explained with reference to the spiral depicted in FIG. 3 as the field storage unit 32. These illustrations also correspondingly apply to all other spiral structures.

The spiral depicted in FIG. 3 is formed by a strip, which, for example, has a width of about 2 micrometers and winds from the outside to the inside with a distance of about 2 micrometers. For example, the spiral has ten turns.

At the end of the spiral, the aforementioned strip becomes smaller and pointed. The width of the strip thus becomes smaller than approximately 2 micrometers. This pointed end region of the spiral can either extend only slightly into the area of the contact 27 or it can be located substantially completely under the contact 27.

The pointed end region of the spiral makes it possible to ensure that in this end region no domain wall can be created or saved. By providing the pointed end region beneath the contact 27, the electrical connection between the spiral and the contact 27 is maintained.

Through the circular configuration of the field generator 31, the magnetization direction of the sensor layer of the field generator 31 can easily follow a passing magnetic field. As mentioned earlier, the magnetization direction of the reference layer, however, does not change because of a passing magnetic field.

FIGS. 4a through 4e illustrate the sensor element the same way again as has been explained with reference to FIG. 3. In addition, however, the arrows in FIGS. 4a through 4e mark the course of the spiral of the field storage 32. These arrows mark the direction of magnetization in the spiral, meaning each individual arrow refers to that region of the spiral on which it is drawn.

In FIG. 4a, all the magnetization directions represented in the area of the field storage 32 run in the same direction, meaning that all the arrows run counterclockwise from the end of the spiral, meaning from the contact 27, in the direction of the beginning of the spiral, meaning in the direction of the field generator 31. Of course, all these arrows could also be represented in a clockwise direction, which would mean that the directions of magnetization represented by the arrows could be oriented in the opposite directions.

For explaining the functionality of the sensor element 11, it is shall be assumed that the orientation of the magnetization direction of the spiral shown in FIG. 4a is present at a first time in the soft magnetic layer 21, meaning in the sensor layer, and also in the hard magnetic layer 23, meaning in the reference layer, of the field storage 32. This can be achieved through appropriate formatting of the field storage 32, meaning by magnetic biasing of the sensor layer and the reference layer of the spiral.

The reference layer is always oriented substantially parallel to the course of the strip of the spiral and is always oriented in the same direction as the spiral. The direction in which the spiral's magnetization is oriented, whether it is clockwise or counterclockwise, is irrelevant. The only essential aspect is that it is always the same direction as the spiral. This orientation of magnetization remains unchanged in the hard magnetic reference layer.

As an example, the permanent magnet 13 is moved past the sensor element 11 because of a rotation of the rotors 12. As mentioned before, this causes the sensor element 11 to "see" a 180-degree rotation of the magnetic field of the permanent magnet 13. As was also mentioned previously, the direction of magnetization of the sensor layer of the field generator 31 follows the passing magnetic field of the permanent magnet 13. The direction of magnetization of the reference layer, however, does not change.

In FIG. 4b, the orientation of the spiral's magnetization direction is in the soft magnetic layer 21, meaning in the sensor layer of the field storage 32, specifically at a second time at which the permanent magnet 13 has already passed the sensor element 11. For illustration purposes, in FIG. 4b the magnetization direction is represented by the arrow 35, which has "seen" the sensor element 11 after the permanent magnet 13 has passed.

As explained earlier, the magnetization direction of the field generator 31 has followed the magnetic field of the permanent magnet 13, so that the arrow 35 in FIG. 4b also represents the magnetization direction of the field generator 31.

A comparison of the direction of the magnetization direction of the field generator 31, represented by the arrow 35 of FIG. 4b, and the magnetization direction of the beginning of the spiral before the permanent magnet 13 passes, shown in FIG. 4a, shows that these magnetization directions are mutually opposed. The result is that near the connection of the field generator 31 to the beginning of the spiral, a domain wall develops (not shown). Due to the one-time change of the magnetization direction, it is a 180-degree field.

This 180-degree field travels from its point of origin at the beginning of the spiral along the same to a point 41 on the spiral. This 180-degree field is marked by a dark rectangle with the reference numeral 42. At this point 41, the 180-degree field 42 exhibits a more favorable energy condition than at its point of origin, as it is only there that the neighboring spiral arches 33, 34 have no anti-parallel components to the magnetization direction marked by the arrow 35.

A comparison of FIG. 4b to FIG. 4a shows that the magnetization direction of the spiral in the sensor layer of the field storage 32 has changed near the first spiral arch 33, while near the second spiral arch 34 and the following spiral arches, this change has not taken place.

At the point 41 between the first spiral arch 33 and the second spiral arch 34, the opposing magnetization directions of both the spiral arches 33, 34 meet each other. According to FIG. 4b, this is due to the fact that the arrows represented point in opposite directions. Approximately at this point 41 on the spiral the 180-degree field 42 is present.

The rotor 12 is further rotated in the same direction, so that the permanent magnet 14 moves past the sensor element 11. Because of this, the magnetization direction of the sensor layer of the field generator 31 follows the passing magnetic field of the permanent magnet 14. However, the magnetization direction of the reference layer does not change.

In FIG. 4c, the orientation of the spiral's magnetization direction in the soft magnetic layer 21, meaning in the sensor layer of the field storage 32, is represented, specifically at the third time at which the permanent magnet 14 has already passed the sensor element 11. A comparison of FIG. 4c to FIG. 4b shows that the magnetization direction of the spiral in the sensor layer of the field storage 32 near the first spiral arch 33 and the second spiral arch 34 has changed, but that this change has not taken place in other arches. The change in the first spiral arch 33 is the result of a further change in the magnetization direction of the field generator 31 caused by the passing permanent magnet 14. The change in the second spiral arch 34 is the result of the 180-degree field 42 moving further, specifically because of the aforementioned repeat changes in the magnetization direction of the first spiral arch 33 and the subsequent change in the energy condition of the 180-degree field 42.

The 180-degree field 42, which was present at the point 41 at the second time shown in FIG. 4b, is therefore found at the third time shown in FIG. 4c at a point 43 that is approximately 180 degrees past the point 41 along the course of the spiral of the field storage 32.

At the point 41 in FIG. 4c, the opposing magnetization directions of both spiral arches 33, 34 meet. At approximately this point 41 of the spiral therefore another 180-degree field 44 can be found, which in FIG. 4c is represented by a dark rectangle. This 180-degree field is created by the aforementioned method near the beginning of the spiral and then moves to the point 41.

The rotor 12 is rotated further in the same direction, so that the permanent magnet 13 again passes the sensor elements 11. As a result, the magnetization direction or the sensor layer of the field generator 31 follows the passing magnetic field of the permanent magnet 13.

In FIG. 4d, the orientation of the magnetization direction of the spiral in the soft magnetic layer 21, meaning in the sensor layer of the field storage 32, is represented, specifically at a fourth time at which the permanent magnet 13 has already moved past the sensor element 11.

In FIG. 4d, the 180-degree field 42 has again moved further, specifically to the point 41 of the spiral. There, however, the 180-degree field 42 has moved to the second turn of the coil and not he first outer turn, as shown in FIG. 4b. Furthermore, the 180-degree field 44 has from the point 41 to the point 43 in the outer turn of the spiral. And finally, another 180-degree field 45 has formed at point 41 in the first outer turn of the spiral.

The rotor (12) is rotated further in the same direction, so that the permanent magnet 14 again passes the sensor element 11. As a result, the magnetization direction of the sensor layer of the field generator 31 follows the passing magnetic field of the permanent magnet 14.

In FIG. 4e, the orientation of the magnetization direction of the spiral in the soft magnetic layer 21, meaning in the sensor layer of the field storage 32, is represented, specifically at a fifth time at which the permanent magnet 14 has already moved past the sensor element 11.

In FIG. 4e, the 180-degree field 42 has moved further again, specifically to the point 43 in the second turn of the spiral. Furthermore, the 180-degree field 44 has moved further to the second turn of the spiral to the point 41. Accordingly, the 180-degree field 45 has moved further to the point 43 in the outer turn. And finally, at the point 41 in the first outer turn of the spiral, an additional 180-degree field 46 has formed.

From the first time in FIG. 4a until the fifth time in FIG. 4e, each of the two permanent magnets 13, 14 passed the sensor element 11 twice. The rotor 12 has made two revolutions. As was explained earlier, the rotor's 12 two revolutions in the spiral of the field storage 32 caused the formation of four domain walls, which are the four 180-degree fields 42, 44, 45, 46. With additional revolutions of the rotor 12 in the same direction, additional domain walls will be formed.

As mentioned earlier and as can be seen in FIG. 4e, the magnetization directions in the sensor layer of the spiral between each of the 180-degree field always oppose each other. This means that in the outer turns of the spiral the magnetization direction reverses after each 180-degree field 42, 44, 45, 46.

In FIG. 5, the sensor element 11 is represented in the same way as it was in FIG. 3 and FIGS. 4a through 4e. In FIG. 5, the different magnetizations of the spiral of the field storage 32, however, are not represented by arrows as they are in FIGS. 4a through 4e, but instead the spiral arches, whose magnetizations differ in FIG. 4e from that shown in FIG. 4a, are marked dark. A comparison of the two Figures mentioned above shows that the spiral arch 34 is in the outer, first turn of the spiral, and the spiral arch 36, which extends adjoining to spiral arch 34, runs in the second, subsequent inner turn of the spiral.

The changed magnetization direction of the spiral arches 34, 36 in FIG. 5 only relate to, as explained previously, the sensor layer of the field storage 32. In the reference layer of respective the spiral arches 34, 36 no changes in the magnetization direction occur. This means that in the area of the spiral arches 34, 36, the magnetization of the sensor layer is oriented anti-parallel to the magnetization of the reference layer. Thus, both spiral arches 34, 36 create electrical resistance, which is high when compared to the other spiral arches, in which the magnetizations of the sensor layer and the reference layer are parallel to each other.

The electrical resistance of the entire spiral can be determined with the help of the aforementioned measurement current flowing through the contacts 26, 27. If a spiral arch is present within the spiral, in which the sensor layer and the reference layer are magnetized anti-parallel, then increased resistance develops. If several spiral arches are present, then this results in a multifold increase in resistance.

To ensure that a spiral arch in the outer turn of the spiral produces the same change in resistance as a spiral arch in the inner turn, the width of the strip that forms the spiral can be varied throughout the process. For example, the width of the strip can decrease from the outside to the inside with the help of the Giant Magnetic Resistance (GMR) effect.

As explained earlier, both of the anti-parallel magnetized spiral arches 34, 36 were formed by two revolutions of the rotor 12, and are represented in FIG. 5. In the embodiment described above, thus one anti-parallel magnetized spiral arch of the field storage 32 corresponds exactly to one revolution of the rotor 12.

Overall, it is therefore possible to draw a conclusion about the electrical resistance of the spiral via the contacts 26, 27 of the sensor element 11. From this, the number of anti-parallel magnetized spiral arches can be determined, and consequently the number of revolutions performed by the rotor 12.

If the rotor 12 is rotated in the opposite direction, then a change in the energy condition of the 180-degree fields in the field storage 32 takes place. This results in the fact that the 180-degree fields move along the spiral in a direction in which the energy condition is most favorable. Due to the opposite revolution of the rotor 12, the 180-degree fields will also move in the opposite direction.

Furthermore, with the afore-described mode of operation, 180-degree fields are created in the field generator 31, which walls situated opposite to the abovementioned 180-degree fields. As a result, the successively developing 180-degree fields will successively cancel the existing 180-degree fields, which are moving in the opposite direction. The anti-parallel magnetized spiral arches represented in FIG. 5 thus vanish from the inside out, until the condition shown in FIG. 4a is again reached.

During the backward revolution of the rotor 12, the number of available anti-parallel magnetized spiral arches can be, as was mentioned earlier, determined with the contact 26, 27.

If the rotor 12 is rotated further in the opposite direction, after all the 180-degree fields in the field storage 32 have been eliminated, new 180-degree fields are formed that will move into the field storage 32 in a way that has already been described. The direction of rotation of the new 180-degree fields is opposite to the direction of rotation of the eliminated 180-degree fields.

If the rotor 12 is rotated until all the turns of the spiral of the field storage 31 have 180-degree fields, further revolutions of the rotor 12 do not produce any further 180-degree fields. The number of the 180-degree fields present will then remain constant.

The mode of operation of the sensor element 11 explained above is independent of any energy supply in terms of the formation of the domain walls and the resulting anti-parallel magnetized spiral arches. This means that a revolution of the rotor (12) will always result in a change in the magnetization directions, in particular also when no electric connection to the contacts 26, 27 exists. The number of revolutions performed by the rotor 12 is then counted and saved without an energy supply in the spiral of the field storage 32.

A measurement current flow via the contacts 26, 27 is only required for reading the field storage 32, meaning for reading the number of revolutions performed by the rotor 12. However, as was mentioned previously, this measurement current is not necessary for counting the revolutions.

The field generator 31 is provided at the beginning of the spiral forming the field storage 32 in the sensor element 11 described above, while at the end of the spiral only the contact 27 is provided. Alternatively, it is possible to place the field generator only at the end of the spiral and not at the beginning.

It is also possible to place a field generator at both the beginning and the end of a spiral.

The revolution counter 10 described above can be used particularly in a motor vehicle. For example, the rotor 12 of the revolution counter 10 can be coupled to the steering shaft of the motor vehicle. When this steering shaft is turned, the revolution counter will capture it. The number of revolutions counted will be stored in the revolution counter even when the motor vehicle is turned off or if there is a defect in the energy supply of the motor vehicle.

FIG. 6 shows a shape 60 of the sensor element 11, which deviates from the shape 30 of the sensor element 11 according to FIG. 3. The sensor element 11 according to FIG. 6 shows several straight pieces that are parallel to each other and that are connected to each other by semi-circular pieces, overall forming a spiral and consequently the field storage 32.

In the sensor element 11 according to FIG. 6, the field generator 31 is disposed in the inner part of the spiral. The two contacts 26, 27 are also indicated in FIG. 6. The magnetization of the hard magnetic layer 23, meaning the reference layer, is oriented preferably substantially parallel to the straight pieces in the sensor element 11 according to FIG. 6.

Otherwise, the explanations given for FIGS. 1 through 5 are the same as for the sensor element 11 in FIG. 6.

FIG. 7 shows a shape 70 of the sensor element 11 that deviates from the shape 30 of the sensor element 11 according to FIG. 3. The shape 70 according to FIG. 7 is similar to the shape 60 according to FIG. 6.

Unlike in FIG. 6, however, the shape 70 according to FIG. 7 is a double spiral.

One of the two spirals of the sensor element 11 according to FIG. 7 corresponds to the spiral of the sensor element 11 according to FIG. 6 and therefore to the field storage 32. The other spiral of the sensor element according to FIG. 7, however, is provided for guiding the internal electric contact to the outside. With this, both contacts 26, 27 are accessible from the outside on the sensor element 11 according to FIG. 7.

Otherwise, the explanations given for FIGS. 1 through 6 are the same as for the sensor element 11 according to FIG. 7.

In FIG. 8, the electric contacts of the sensor element 11 are configured differently from those in, for example, FIG. 6. While the sensor element 11 according to FIG. 6 has the contacts 26, 27 at the beginning and at the end of the spiral, the sensor element 11 according to FIG. 8 does not. Instead, the contacts 26', 27' extend across the area of the semi-circular pieces of the spiral, so that only the area of the straight pieces is not covered by the contacts 26',27'.

This means that the semi-circular pieces in the area of the two contacts 26, 27 are electrically short-circuited.

While in the sensor element 11 according to FIG. 6, the consecutive semi-circular pieces in combination with the straight pieces of the spiral form a serial electric connection, this is not the case for the sensor element 11 according to FIG. 8 because of the short-circuiting effect of the contacts 26', 27'. Instead, the straight pieces of the spiral form a parallel electrical connection, to which the semi-circular pieces do not contribute in any way.

As in the case of the sensor element 11 according to FIG. 6, with the sensor element 11 according to FIG. 8 the electric resistance of the spiral can be read via the contacts 26', 27'. The sensor element 11 according to FIG. 8, however, has a smaller electrical resistance than the sensor element according to FIG. 6.

Otherwise, the explanations given for FIGS. 1 through 6 are the same as for the sensor element 11 according to FIG. 8.

In FIG. 9, the electric contacts of the sensor element 11 are configured differently than in, for example, FIG. 6. While the sensor element 11 according to FIG. 6 has the contacts 26, 27 at the beginning and the end of the spiral, the sensor element 11 according to FIG. 9 does not. Instead, the contacts 26", 27" are provided at the beginning and the end of each of the straight pieces.

The number of pairs of available contacts 26", 27" thus corresponds to the number of straight pieces. Preferably, the contacts 26",27" are mutually spaced in such a way that all the straight pieces are substantially of equal length.

With this configuration of the contacts 26", 27", it is possible to read the electrical resistance of each straight piece separately. The entire electrical resistance of the spiral can then be derived from these partial resistance values.

Otherwise, the explanations given for FIGS. 1 through 6 are the same as for the sensor element 11 according to FIG. 9.

In FIGS. 10a and 10b, four sensor elements 11 are assembled to form a Wheatstone bridge 100. The sensor elements 11 can be any of the embodiments as described in FIGS. 3 through 9.

In the Wheatstone bridge 100 according to FIGS. 10a and 10b, the spirals of two sensor elements 11, respectively, have a sense of turn that is oriented opposite to the spirals of the respectively other two sensor elements 11. In FIGS. 10a and 10b, the spirals that are wound clockwise have been assigned the reference numeral 101, while the spirals that are wound counter-clockwise have been assigned the reference numeral 102.

In the Wheatstone bridge 100 according to FIG. 10a, contacts 103, 104, 105, 106 are provided, which similarly to those in the sensor element 11 according to FIG. 8 short-circuit the semi-circular shaped pieces of the respective sensor elements 11. Furthermore, these contacts 103, 104, 105, 106 have been mutually connected in such a way that the straight pieces of the four sensor elements 11 form a parallel electric connection.

For the Wheatstone bridge 100 according to FIG. 10b, contacts 107, 108, 109, 110 are provided, which connect the beginning and the end of the spiral of the respective sensor elements 11 with each other. The contacts 107, 108, 109, 110 are disposed and electrically isolated from the individual coils such that the spirals of the sensor elements 11 overall form an electric series connection.

With respect to the sensor elements in the FIGS. 10a and 10b, the explanations given for FIGS. 1 through 9 apply accordingly.

The invention claimed is:

1. A sensor element for a revolution counter, including a laminated structure, the counter, without a power supply, being suitable to cause a change in the magnetization of the sensor element when a magnetic field is moved past the sensor element, and to save a plurality of such changes, the sensor element including a spiral structure.

2. The sensor element according to claim 1, wherein, in the spiral structure, a 180-degree field develops when a magnetic field passes the sensor element.

3. The sensor element according to claim 2, wherein several 180-degree fields are storable in the spiral structure.

4. A sensor element according to claim 1, wherein one end of the spiral structure is connected to an area known as a field generator.

5. The sensor element according to claim 4, wherein the field generator is substantially a circular-shape surface.

6. The sensor element according to claim 4, wherein the field generator is connected to a first electric contact.

7. A sensor element according to claim 4, wherein the other end of the spiral structure is connected to a second electric contact.

8. A sensor element according to claim 4, wherein the other end of the spiral structure is pointed.

9. A sensor element according to claim 1, wherein the spiral structure includes a laminated structure with consecutively at least one soft magnet layer, at least one non-magnetic layer and at least one hard magnetic layer.

10. The sensor element according to claim 9, wherein the soft magnetic layer represents a sensor layer in which the magnetization changes due to the passing of a magnetic field, and wherein the hard magnetic layer represents a reference layer in which the magnetization does not change with the passing of a magnetic field.

11. The sensor element according to claim 9, wherein anti-parallel magnetization in an area of the spiral structure causes increased electric resistance in the area.

12. A sensor element according to claim 9, wherein the magnetization of the reference layer includes an orientation that is substantially parallel to the course of the spiral structure and always has the same direction as the spiral structure.

13. A sensor element according to claim 9, wherein the spiral structure includes a plurality of straight pieces, extending substantially parallel to one another, and that the magnetization of the reference layer includes an orientation that is substantially parallel to the straight pieces.

14. A sensor element according to claim 1, wherein the spiral structure is a double spiral, with one of the two spirals being provided for electric contacting.

15. A sensor element according to claim 1, wherein the spiral structure includes both semi-circular and straight pieces, and wherein the semi-circular pieces are short-circuited and form electric contacts.

16. A sensor element according to claim 1, wherein the spiral structure includes semi-circular and straight pieces, and wherein the straight pieces are connected separately.

17. A Wheatstone bridge, comprising four sensor elements according to claim 1.

18. A revolution counter, comprising at least one sensor element according to claim 1.

19. The revolution counter according to claim 18, further comprising at least one permanent magnet, movable past the sensor element.

20. The revolution counter according to claim 19, wherein the passing of the permanent magnet from the view of the sensor element represents a rotation of the magnetic field by 180 degrees.

21. A revolution counter according to claim 18, for use in connection with a steering shaft of the motor vehicle.

* * * * *